US009077778B2

(12) United States Patent
Yoneyama et al.

(10) Patent No.: US 9,077,778 B2
(45) Date of Patent: Jul. 7, 2015

(54) TELECOMMUNICATIONS SYSTEM WITH SERVER SECURING STORAGE FOR A DEVICE

(75) Inventors: Masayuki Yoneyama, Osaka (JP); Seiichi Minami, Osaka (JP); Yuichiro Miyamoto, Osaka (JP); Tetsuharu Murayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 392 days.

(21) Appl. No.: 13/589,425

(22) Filed: Aug. 20, 2012

(65) Prior Publication Data
US 2013/0086223 A1 Apr. 4, 2013

(30) Foreign Application Priority Data

Aug. 23, 2011 (JP) ................................. 2011-181253

(51) Int. Cl.
G06F 15/16 (2006.01)
H04L 29/06 (2006.01)
(52) U.S. Cl.
CPC ............. *H04L 67/42* (2013.01); *H04L 63/0876* (2013.01); *H04L 63/102* (2013.01)
(58) Field of Classification Search
CPC .............................. H04L 67/42; H04L 67/102
See application file for complete search history.

(56) References Cited

U.S. PATENT DOCUMENTS 6,714,968 B1 * 3/2004 Prust .............................. 709/219
8,296,763 B1 * 10/2012 Peercy et al. ..................... 718/1
8,694,744 B1 * 4/2014 Raj et al. ........................ 711/162
2003/0033254 A1 * 2/2003 Tanaka ............................ 705/57
2003/0061115 A1 3/2003 Wachi
2003/0084076 A1 * 5/2003 Sekiguchi et al. ............. 707/205
2003/0217118 A1 11/2003 Kobayashi et al.
2004/0143718 A1 * 7/2004 Chen et al. ..................... 711/202
2008/0077600 A1 3/2008 Nakamura et al.

(Continued)

FOREIGN PATENT DOCUMENTS

JP 5-216801 A 8/1993
JP 2002-165046 A 6/2002

(Continued)

*Primary Examiner* — Thomas Dailey
(74) *Attorney, Agent, or Firm* — Renner, Otto, Boisselle & Sklar, LLP

(57) ABSTRACT

A telecommunications system includes at least one telecommunications device and a server that is able to communicate with the telecommunications device over a network. The telecommunications device includes: a storage section in which stored is property information that identifies the device itself uniquely; and a communications section which sends the property information to the server when communicating with the server for the first time. The server includes: a storage device; a server communications section which receives the property information; and a controller which secures a storage space associated with that property information in the storage device on receiving the property information. The controller generates account information which allows a user to have access to the storage space secured and which is associated with the property information gotten. The server communications section sends the account information to the telecommunications device that has transmitted the property information.

11 Claims, 10 Drawing Sheets

(56) References Cited

U.S. PATENT DOCUMENTS

| | | | |
|---|---|---|---|
| 2009/0222509 A1* | 9/2009 | King et al. | 709/203 |
| 2010/0014831 A1 | 1/2010 | Nakano | |
| 2010/0066839 A1 | 3/2010 | Azuma et al. | |
| 2012/0005159 A1* | 1/2012 | Wang et al. | 707/617 |
| 2012/0215896 A1* | 8/2012 | Johannsen | 709/223 |
| 2012/0331088 A1* | 12/2012 | O'Hare et al. | 709/214 |

FOREIGN PATENT DOCUMENTS

| | | |
|---|---|---|
| JP | 2003-169734 A | 6/2003 |
| JP | 2004-102548 A | 4/2004 |
| JP | 2006-114032 A | 4/2006 |
| JP | 2007-004642 A | 1/2007 |
| JP | 2008-236159 A | 10/2008 |

* cited by examiner

TELECOMMUNICATIONS SYSTEM WITH SERVER SECURING STORAGE FOR A DEVICE

BACKGROUND

1. Technical Field

The present application relates to a telecommunications device and more particularly relates to a telecommunications device that communicates with a server.

2. Description of the Related Art

An image sharing system which allows the user and other people to share an image that he or she has shot with an image capture device such as a digital camera is known. For example, Japanese Laid-Open Patent Publication No. 2008-236159 discloses a technique for storing images that have been shot with a digital camera in such an image sharing server. According to Japanese Laid-Open Patent Publication No. 2008-236159, those images are stored in a storage space in the image sharing server. When the image sharing server presents a code indicating the storage space in the image sharing server to the user, he or she shoots the code with a telecommunications device with a camera and accesses the image sharing server in accordance with the code that has been shot. In this manner, an image sharing system that allows the user and other people to get any image they want is realized.

SUMMARY

To a system in which a telecommunications device such as a digital camera with a communications section gets connected to an external server and gets content shared, a scheme for ensuring the security of that system configuration itself needs to be introduced.

Thus, the present application provides a telecommunications system which is usable more easily for any user while enhancing the security of the telecommunications system itself.

A telecommunications system as an exemplary embodiment of the present invention includes at least one telecommunications device and a server that is able to communicate with the at least one telecommunications device over a network. The at least one telecommunications device includes: a storage section in which stored is property information that identifies the device itself uniquely; and a communications section which sends the property information to the server when communicating with the server for the first time. The server includes: a storage device; a server communications section which receives the property information; and a controller which secures a storage space associated with that property information in the storage device on receiving the property information. The controller generates account information which allows a user to have access to the storage space secured and which is associated with the property information gotten. The server communications section sends the account information to the telecommunications device that has transmitted the property information.

According to such an embodiment, a telecommunications system which is usable more easily for any user can be provided while enhancing the security of the telecommunications system itself.

BRIEF DESCRIPTION OF THE DRAWINGS

FIG. 7 is a flowchart showing how this system works when the digital camera 100 is connected to the image sharing server 300 from the second time and on.

DETAILED DESCRIPTION

Hereinafter, embodiments will be described with reference to the accompanying drawings as needed. It should be noted that the description thereof will be sometimes omitted unless it is absolutely necessary to go into details. For example, description of a matter that is already well known in the art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Figure 1:
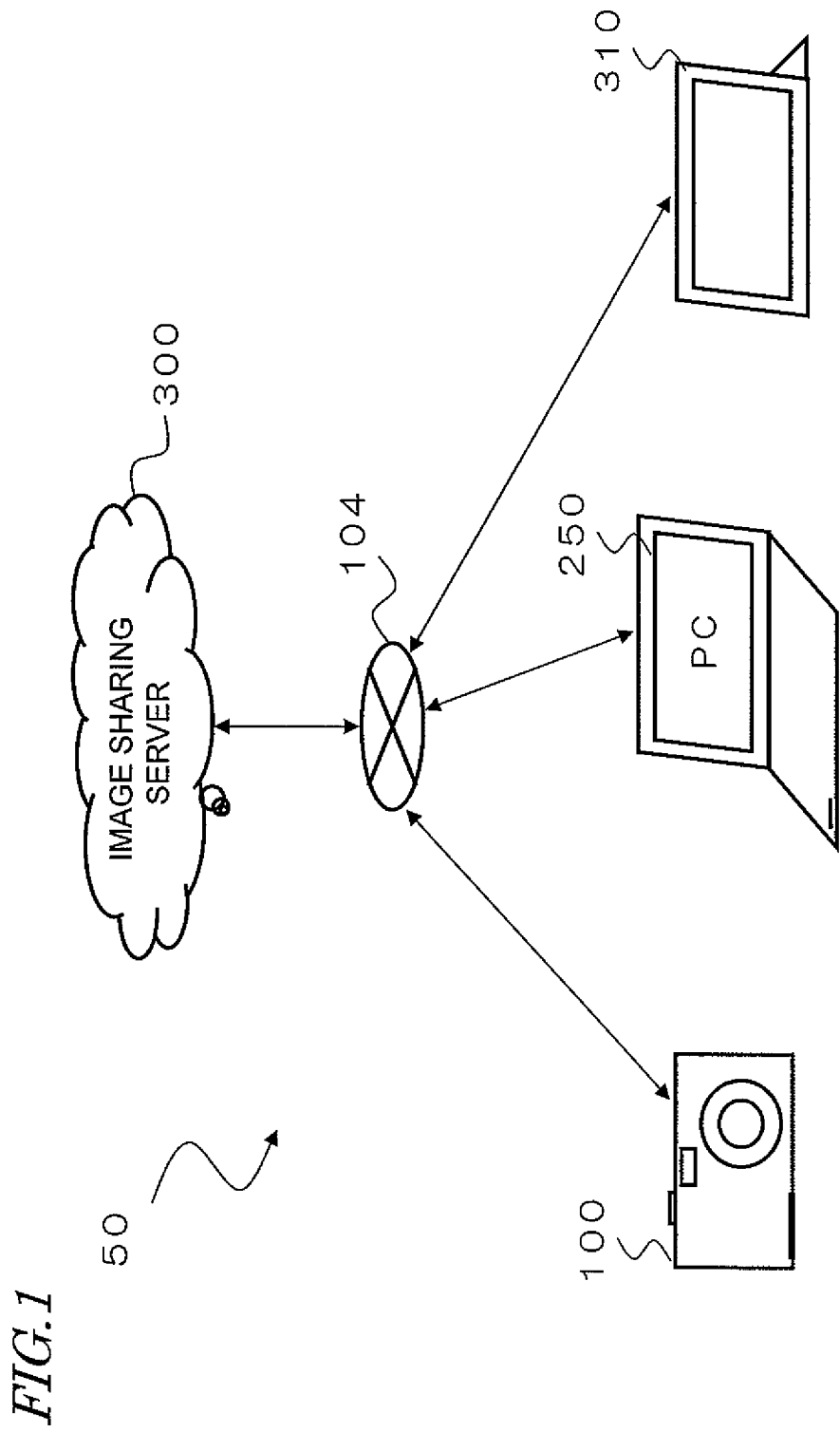
FIG. 1 illustrates conceptually the configuration of a telecommunications system 50 in which an image sharing server 300 and telecommunications devices are connected together.

A telecommunications system as an embodiment of the present disclosure is formed by connecting an image sharing server 300 and telecommunications devices together. FIG. 1 illustrates conceptually the configuration of a telecommunications system 50 in which the image sharing server 300 and the telecommunications devices are connected together. As shown in FIG. 1, multiple telecommunications devices with a telecommunication function, including a digital camera 100, a personal computer (which will be referred to herein as a "PC") 250 and a digital media frame 310, are connected to the image sharing server 300 via the Internet 104.

In the telecommunications system of this embodiment, each of the telecommunications devices such as the digital camera 100 and the digital media frame 310 has its own device ID, and the image sharing server 30 secures a storage space which is linked with the device ID of the telecommunications device that has gotten connected. As a result, even a content generator such as the digital camera 100, a storage device such as digital content storage, and a device that generates and writes content such as a smart phone can also write the content generated (e.g., an image shot) in that storage space that has been secured in the image sharing server 300.

In addition, even a content display device such as the digital media frame 310, a storage device such as digital content storage, and a device that generates and writes content such as a smart phone can also read and display content (such as an image) that has been written in the storage space generated in the image sharing server 300.

Also, a telecommunications system according to this embodiment includes telecommunications devices (such as the digital camera 100 and the digital media frame 310) and an image sharing server 300 that is able to communicate with the telecommunications devices over a network 104. Each of the telecommunications devices (such as the digital camera 100 and the digital media frame 310) includes: an information storage section (e.g., a flash memory 142, 317) in which its own device ID is stored; a communications section (e.g., communications section 171, 311) which is able to communicate with the image sharing server 300; and a communication control section (e.g., a controller 130, 312) which instructs the communications section (e.g., the communications section 171, 311) to notify the image sharing server 300 of its own device ID when communicating with the image sharing server 300 for the first time. The image sharing server 300 includes: a getting section (e.g., a communications section 301) which gets the device ID from the telecommunications device (such as the digital camera 100 or the digital media frame 310) when communicating with the telecommunications device (such as the digital camera 100 or the digital media frame 310) for the first time; a storage space securing section (e.g., a controller 302) which secures a storage space linked with the device ID gotten in the image sharing server 300; and an information replying section (i.e., a communications section) 301 which has access privilege to that storage space secured and which sends back account information linked with the device ID gotten and access information indicating a location to access the storage space secured to the telecommunications device (such as the digital camera 100 or the digital media frame 310).

In the telecommunications system of this embodiment, a device ID which is protected highly securely with respect to the system itself is used when the telecommunications device that owns that device ID communicates with the image sharing server for the first time. When the communication is made from the second time and on, the account information and access information issued by the image sharing server will be used instead of the device ID. In this manner, a telecommunications system which is usable more easily for any user can be provided while enhancing the security of the system configuration itself. In this case, the "access information" may be the address number of a target storage space to access. Or the "access information" may also be a URL (universal resource locator) with which the storage space can be located uniquely. Still alternatively, the "access information" may also be an email address that is given uniquely to the user who is going to use that storage space. That is to say, any piece of information may be used as the "access information" as long as the target storage space to access can be located with that piece of information.

Hereinafter, the configurations and operations of the digital camera 100, the PC 250, the Internet image sharing server 300, and the digital media frame 310 will be described. In the following example, the "access information" is supposed to be as "access number" as an example.

1. Configuration

Now it will be described with reference to the accompanying drawings what configurations the digital camera 100, the PC 250 and the Internet image sharing server 300 may have.

[1-1. Configuration of Digital Camera 100]

Figure 2:
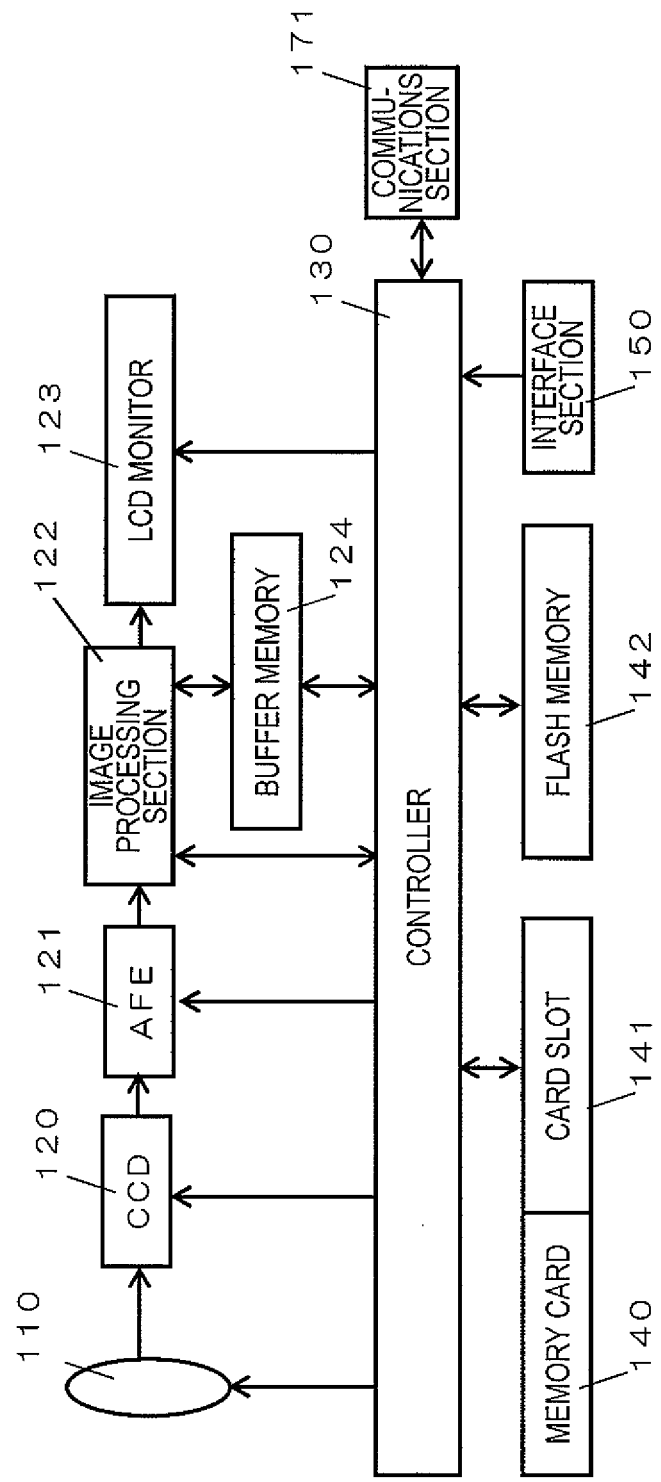
FIG. 2 illustrates an electrical configuration for a digital camera 100.

FIG. 2 illustrates an electrical configuration for the digital camera 100. The digital camera 100 gets a subject image which has been produced through an optical system 110 captured by a CCD image sensor 120. Based on the subject image that has been shot, the CCD image sensor 120 generates image data. The image data that has been generated as a result of shooting is subjected to various kinds of processing at an AFE (analog front end) 121 or an image processing section 122. The image data thus generated is then written on either a flash memory 142 or a memory card 140. When requested by the user using a user interface 150, the image data that has been written on the flash memory 142 or the memory card 140 will be displayed on an LCD monitor 123.

The overall operation of the digital camera 100 is under the control of a controller 130, which may be implemented as either a hardwired electronic circuit or a microcomputer. Alternatively, the controller 130 and the image processing section 122 may be integrated together in a single semiconductor chip as well.

The flash memory 142 functions as an internal memory on which image data and other kinds of data are written. Also, the flash memory 142 stores the device ID, which is a piece of property information given to this digital camera 100 during the manufacturing process. Furthermore, as will be described in detail later, the flash memory 142 also stores the account information and access number that have been given by the image sharing server 300.

A buffer memory 124 is provided as a work memory for an image processing section 122 and the controller 130. The buffer memory 124 may be implemented as a DRAM (dynamic random access memory), for example.

In addition, a card slot 141 is further provided as a connection means, to/from which the memory card 140 is attachable and removable. In this case, the memory card 140 can be connected both electrically and mechanically to the card slot 141. Optionally, the card slot 141 may have the function of controlling the memory card 140.

A communications section 171 is provided as a wireless or wired communications interface. Using this communications section 171, the controller 130 can be connected to the Internet via an access point. The communications section 171 may be implemented as a USB, a Bluetooth™ device, a wireless LAN or a wired LAN, for example.

The interface section 150 collectively refers to a number of operating buttons and levers that are provided on the housing of the digital camera 100, and accepts the user's instructions. On accepting a user's instruction, the interface section 150 sends various operation instruction signals to the controller 130.

[1-2. Configuration of PC 250]

Figure 3:
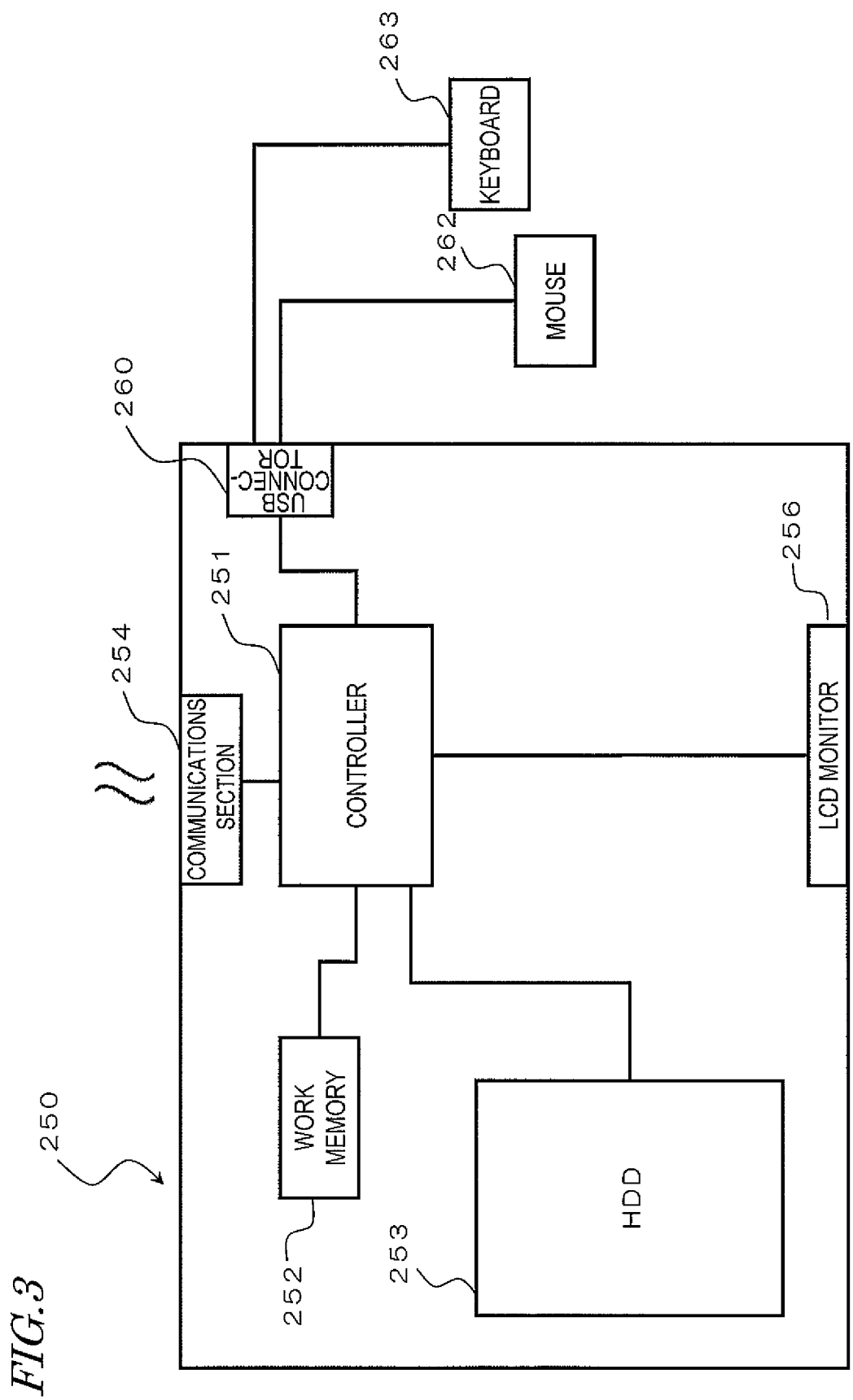
FIG. 3 illustrates an electrical configuration for a PC 250.

Next, the configuration of the PC 250 will be described with reference to FIG. 3, which illustrates an electrical configuration for the PC 250.

The PC 250 includes a controller 251, a work memory 252, an HDD 253, a communications section 254, an LCD monitor 256, a USB connector 260, a card slot 261, a mouse 262, and a keyboard 263.

The controller 251 is a processing section which performs various kinds of processing on the PC 250, and is electrically connected to the work memory 252, the HDD 253, the communications section 254, the LCD monitor 256, the USB connector 260, the card slot 261, the mouse 262, and the keyboard 263. The controller 251 receives, via the USB connector 260, information about the user's instructions that have been entered with the mouse 262 or the keyboard 263. The controller 251 can read the data that is stored on the HDD 253 and performs an overall control on the system in terms of the power supplied to respective parts of the PC 250, for example.

The work memory 252 is a memory that temporarily stores information required for the controller 251 to perform various kinds of processing operations.

The HDD 253 is a disc drive with a huge storage capacity to store the various kinds of data. As described above, the various kinds of data that is stored on the HDD 253 may be read as needed by the controller 251. It should be noted that the HDD 253 is a kind of storage medium. Optionally, the HDD 253 may be replaced with a so-called "SSD (solid state disc)", an optical disc drive, an optical tape machine or a magnetic recorder.

The mouse 105 is a pointing device that accepts the instructions that have been entered by the user. The keyboard 106 is a keyboard device with which the user can enter characters and other kinds of information.

The USB connector 260 is an interface to be connected to another device's USB connector through a USB cable. The controller 251 can send and receive information to/from another device via the USB connector 260 and the USB cable. The USB connector 260 is connected to the digital camera 100, the mouse 262, the keyboard 263, and so on.

The communications section 254 can send the image data that has been received from the controller 251 to another device over the Internet. The communications section 254 may be implemented as a wired LAN or a wireless LAN, for example.

[1-3. Configuration of Image Sharing Server 300]

Figure 4:
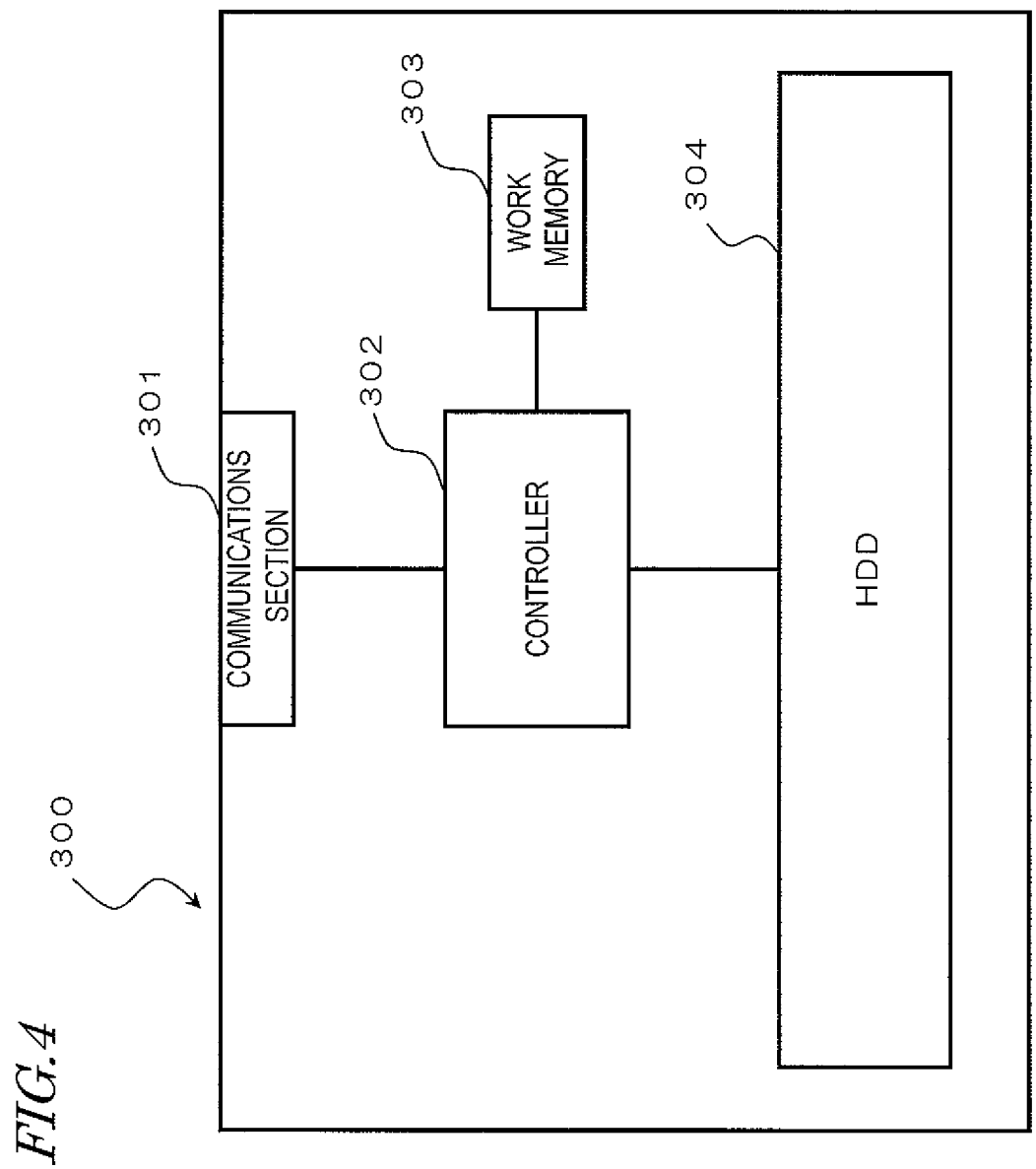
FIG. 4 illustrates an electrical configuration for the image sharing server 300.

Next, the configuration of the image sharing server 300 will be described with reference to FIG. 4, which illustrates an electrical configuration for the image sharing server 300.

The image sharing server 300 includes a controller 302, a work memory 303, an HDD 304, and a communications section 301.

The controller 302 is a processing section which performs various kinds of processing on the image sharing server 300, and is electrically connected to the work memory 303, the HDD 304, and the communications section 301. The controller 302 can read the data that is stored on the HDD 304.

As will be described in detail later, the controller 302 of the image sharing server 300 secures a storage space which is linked with the device ID of the telecommunications device connected (such as the digital camera 100 or the digital media frame 310) on the HDD 304. The controller 302 also writes a management table on the HDD 304. The management table is a table showing the correspondence between the device ID, the account information and the access number. The following Table 1 shows an exemplary data structure of the management table. The image sharing server 300 has as many tables of this type as the device IDs registered.

TABLE 1

| Device ID | Account information | Access number |
|---|---|---|
| PanaDSCLX7A100756F | Abc999 | 0akcSSMf |

The work memory 303 is a memory that temporarily stores information required for the controller 302 to perform various kinds of processing operations. In order to perform those various kinds of processing, the controller 302 refers to the management table that is temporarily stored in the work memory 303.

The HDD 304 is a disc drive with a huge storage capacity to store the various kinds of data. As described above, the various kinds of data that is stored on the HDD 304 may be read as needed by the controller 302. As described above, the communications section 301 can receive image data from another device over the Internet.

The communications section 301 may be implemented as a wired LAN or a wireless LAN, for example.

It should be noted that the HDD 304 is a kind of storage medium. Optionally, the HDD 304 may be replaced with a so-called "SSD (solid state disc)", an optical tape machine or a magnetic recorder.

The controller 302 gets the device ID (only for the first time) or the account information and access number (from the second time and on) from the telecommunications device connected such as the digital camera 100 or the digital media frame 310 via the communications section 301. Then, the controller 302 may control reading and writing from/on the storage space that is linked with the information gotten from the telecommunications device.

[1-4. Configuration of Digital Media Frame 310]

Figure 5:
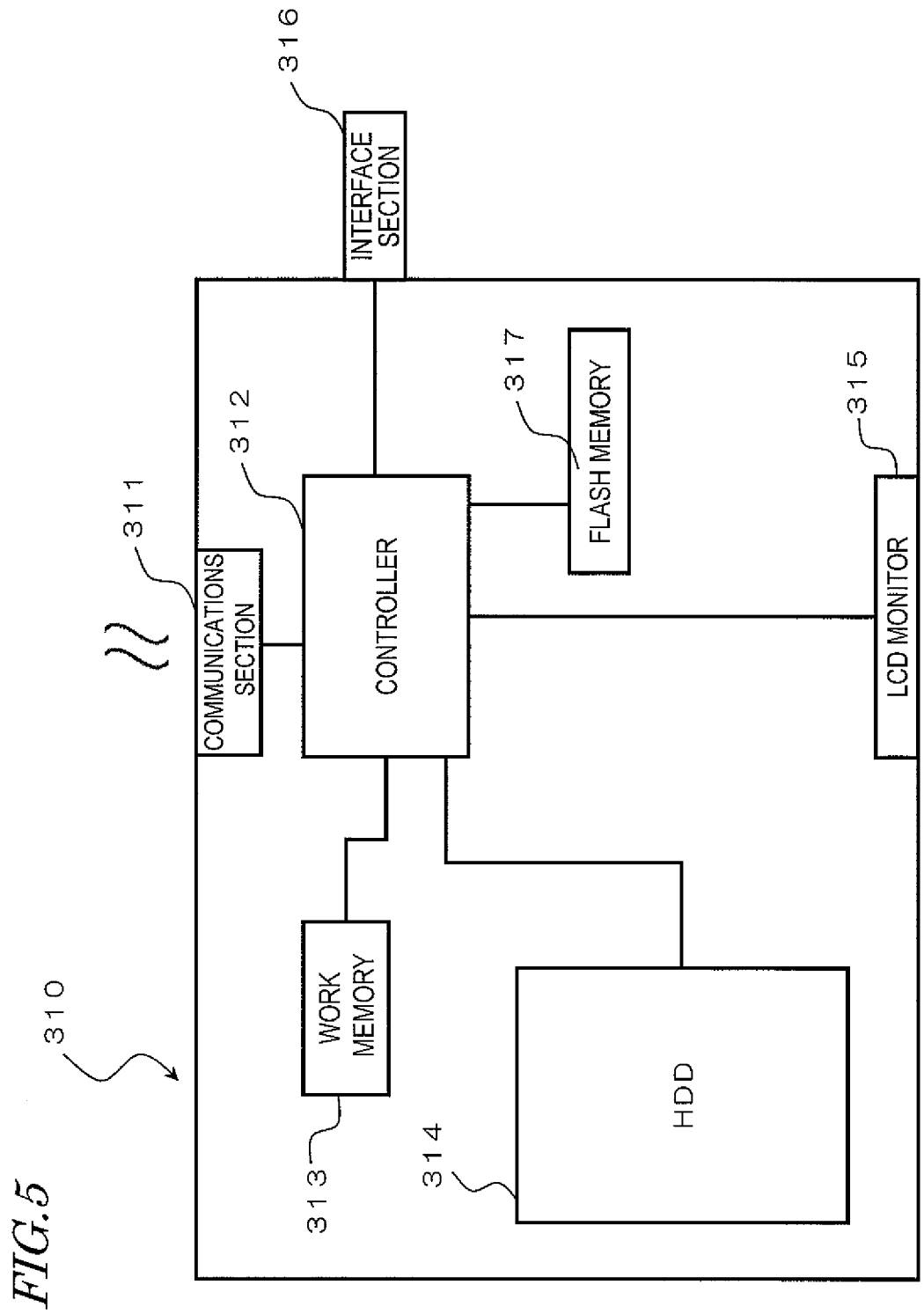
FIG. 5 illustrates an electrical configuration for a digital media frame 310.

Next, the configuration of the digital media frame 310 will be described with reference to FIG. 5, which illustrates an electrical configuration for the digital media frame 310. The digital media frame 310 plays back video and audio based on multimedia data such as image data, moving picture data and audio data.

The digital media frame 310 includes a communications section 311, a controller 312, a work memory 313, an HDD 314, an LCD monitor 315, an interface section 316, and a flash memory 317.

The controller 312 is a processing section which performs various kinds of processing on the digital media frame 310, and is electrically connected to the communications section 311, the work memory 313, the HDD 314, the LCD monitor 315, the interface section 316, and the flash memory 317. The controller 312 accepts the user's instructions that have been entered with the interface section 316. The controller 312 can read the data that is stored on the HDD 314 and the flash memory 317.

The work memory 313 is a memory that temporarily stores information required for the controller 312 to perform various kinds of processing operations.

The HDD 314 is a disc drive with a huge storage capacity to store the various kinds of data. As described above, the various kinds of data (such as image data) that is stored on the HOD 314 may be read as needed by the controller 312. It should be noted that the HDD 314 is a kind of storage medium. Optionally, the HDD 314 may be replaced with a flash memory. In that case, the flash memory may be built in the digital media frame 310 or may also be a removable one.

The communications section 311 is provided as a wireless or wired communications interface. Using this communications section 311, the controller 312 can be connected to the Internet via an access point. The communications section 311 may be implemented as a USB, a Bluetooth™ device, a wireless LAN or a wired LAN, for example.

The flash memory 317 functions as an internal memory on which image data and other kinds of data are written. Also, the flash memory 317 stores the device ID, which is a piece of property information given to this digital media frame 310 during the manufacturing process. Furthermore, as will be described in detail later, the flash memory 317 also stores the account information and access number that have been given by the image sharing server 300.

The digital media frame 310 can also store content data (such as image data) that has been downloaded from the image sharing server 300 on the HDD 314 and can play back that content data. It should be noted that the download operation is just an exemplary method of receiving the content data. According to the present disclosure, the "reception" processing includes not only the content data downloading processing but also streaming processing for browsing as well. The streaming processing is processing for playing content data being received. When the streaming processing is carried out, the content data is temporarily stored in a storage medium such as a buffer. However, when the content data finishes being played back, that data is deleted from the buffer and will not be stored there permanently.

2. Operation

Hereinafter, it will be described how the telecommunications system operates by making the digital camera 100, the PC 250, the image sharing server 300, and the digital media frame 310 communicate with each other. Although the digital camera 100, PC 250, image sharing server 300 or digital media frame 310 will be sometimes described as the subject of the operation in the following description, it is the controller of each of these devices that actually carries out that operation while controlling the other components of its own. However, a detailed description of the operations of those components will be sometimes omitted for the sake of simplicity.

Figure 6:
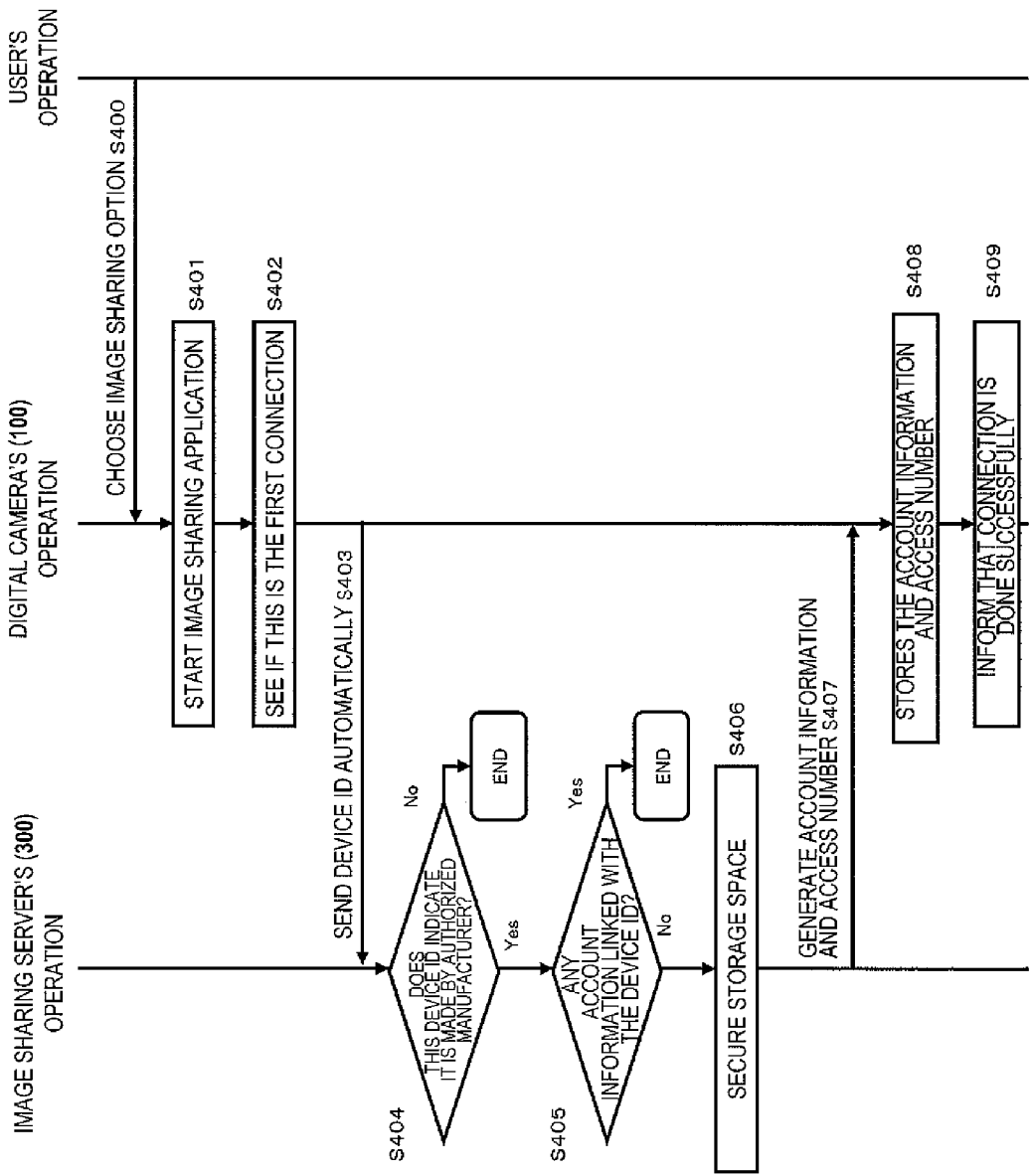
FIG. 6 is a flowchart showing how the digital camera 100 and the image sharing server 300 operate when connected with each other for the first time.

FIG. 6 is a flowchart showing how the digital camera 100 and the image sharing server 300 operate when connected with each other for the first time.

In order to connect the digital camera 100 to the image sharing server 300, first of all, the user of the digital camera 100 chooses an image sharing option by operating the interface section 150 (in Step S400). Specifically, first, the user gets the menu of the digital camera 100 displayed on the LCD monitor 123. Next, by operating the interface section 150, the user chooses the image sharing option from the menu being displayed on the LCD monitor 123 and then enters that choice. When the choice of the image sharing option is entered by the user, the controller 130 of the digital camera 100 retrieves an image sharing application from the flash memory 142 and performs startup processing (in Step S401). In this manner, the controller 130 now gets ready to perform various image sharing related functions.

First of all, the controller 130 sees if the digital camera 100 is going to get connected to the image sharing server 300 for the first time (in Step S402). Specifically, unless the digital camera 100 is connected to the image sharing server 300 for the first time, the management table (i.e., Table 1) should be stored in the flash memory 142 as will be described in detail later. That is why if no management table that stores its account information or access information is found in the flash memory 142, then the controller 130 determines that the digital camera 100 will be connected to the image sharing server 300 for the first time.

If the digital camera 100 is going to be connected to the image sharing server 300 for the first time, the controller 130 of the digital camera 100 sends the device ID of the digital camera 100 to the image sharing server 300 (in Step S403). The device ID of the digital camera 100 is a piece of property information that is uniquely given to the digital camera 100 as a product during the manufacturing process of the product. That is to say, even a camera of exactly the same type as the digital camera 100 is given a different device ID from the digital camera's (100). Thus, the image sharing server 300 can identify respective digital camera products. Also, each device ID may be made up of the manufacturer, product category, product code and serial number of the product. Thus, the image sharing server 300 can perform various kinds of controls and regulations and provide a variety of services, according to the manufacturer, product category, product code and serial number of the product represented by the device ID. For example, the image sharing server 300 can provide a variety of services for only products made by manufacturers authorized by the image sharing server 300. Or the image sharing server 300 may change the contents of the services according to the product category and the product code.

On getting the device ID from the digital camera 100, the image sharing server 300 checks the contents of the device ID (in Step S404). First of all, the image sharing server 300 reads the manufacturer information included in the device ID. Optionally, a table of correspondence between the device IDs and manufacturer information may be compiled in advance and the manufacturer information may be gotten from the device ID that has been read by reference to that table.

If the manufacturer information included in the device ID indicates that the manufacturer of this digital camera 100 is not authorized by the image sharing server 300, then the image sharing server 300 notifies the digital camera 100 that the digital camera 100 may not be connected to the image sharing server 300. On the other hand, if the manufacturer information included in the device ID indicates that the manufacturer of this digital camera 100 is authorized by the image sharing server 300, then the image sharing server 300 sees if the account information linked with the device ID is found in the management table that is managed in the memory region in the image sharing server 300 (in Step S405). If the account information linked with the device ID is found in the management table, then the image sharing server 300 notifies the digital camera 100 that a storage space has already been secured in the mage sharing server 300 for the device ID of the digital camera 100. In that case, the image sharing server 300 does not secure a storage space again for the device ID received. That is to say, by making such a device ID based management, it is possible to avoid securing a redundant storage space in the image sharing server 300 for the digital camera 100 for which a storage space has already been secured.

On the other hand, if the account information linked with the device ID is not found anywhere in the management table, then the image sharing server 300 secures a storage space linked with that device ID (with a size of 2 GB, for example) (in Step S406). Then, the image sharing server 300 generates account information indicating that the digital camera 100 has privilege to access the image sharing server 300 from now on. At the same time, the image sharing server 300 also generates an access number for use to read and write data from/on the storage space that is linked with that device ID. After having generated the account information and the access number, the image sharing server 300 generates a management table in which the device ID, the account information and the access number are linked with each other. Then, the image sharing server 300 saves that management table generated in its own memory area.

After having generated the management table, the image sharing server 300 notifies the digital camera 100 of the account information and access number generated (in Step S407). In response, the controller 130 of the digital camera 100 stores the account information and access number provided in the flash memory 142 (in Step S408). When connected again to the image sharing server 300 in the future, the account information and access number that are stored in the flash memory 142 will be retrieved by the controller 130 on demand. Also, in accordance with the user's instruction that has been entered through the interface section 150, the account information and access number that are stored in the flash memory 142 are displayed on the LCD monitor 123. As a result, the user can write down the account information and access number that have been given by the image sharing server 300 to the digital camera 100 lest the information stored in the flash memory 142 should be deleted for some reason.

For example, if the user has happened to initialize the digital camera 100 even though a storage space linked with the device ID of the digital camera 100 has already been secured on the image sharing server 300, the account information and access number will be deleted from the flash memory 142. In that case, when the digital camera 100 is connected to the image sharing server 300 next time, the controller 130 determines in Step S504 described above that this is the first time the digital camera 100 is connected to the image sharing server 300. However, since a storage space linked with that device ID has already been secured in the image sharing server 300, no new account information is generated anymore. Nevertheless, since the account information and access number that are required when accessing that storage space are no longer retained in the digital camera 100, the digital camera 100 cannot access the storage space that has been given to itself. Thus, if the user writes down the account information and access number that are displayed on the LCD monitor 123 when the account information is issued just in case such a situation happens, then he or she can set up the digital camera 100 all over again so as to gain access to the storage space linked with the device ID. Specifically, by entering the account information and access number that have been written down into the digital camera 100, he or she can set up the digital camera 100 all over again.

On storing the account information and access number in the flash memory 142, the digital camera 100 posts, on the LCD monitor 123, an alert saying that the digital camera 100 has gotten connected to the image sharing server 300 (in Step S409). Thus, the user can easily confirm that the digital camera 100 has gotten connected.

As described above, according to this embodiment, just by choosing the image sharing option on the menu and giving an instruction to share images, the user can get his or her digital camera 100 connected to the image sharing server 300 automatically. In this manner, a user friendly, network connectable digital camera can be provided.

Figure 7:
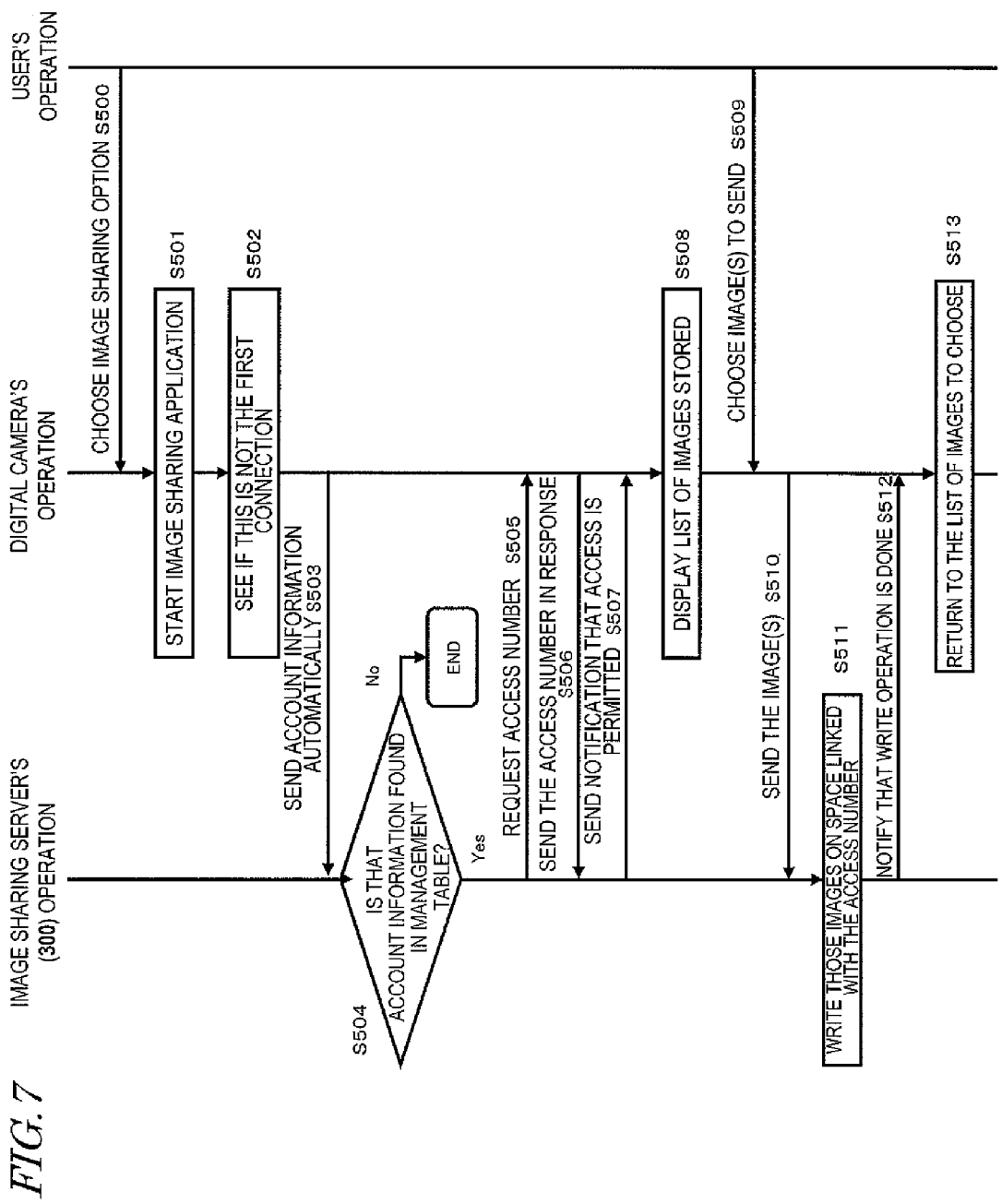

FIG. 7 is a flowchart showing how this system works when the digital camera 100 is connected to the image sharing server 300 from the second time and on.

In order to connect the digital camera 100 to the image sharing server 300, first of all, the user of the digital camera 100 chooses an image sharing option by operating the interface section 150 of the digital camera 100 (in Step S500). Specifically, first, the user gets the menu of the digital camera 100 displayed on the LCD monitor 123. Next, by operating the interface section 150, the user chooses the image sharing option from the menu being displayed on the LCD monitor 123 and then enters that choice. When the choice of the image sharing option is entered by the user, the controller 130 of the digital camera 100 retrieves an image sharing application from the flash memory 142 and performs startup processing (in Step S501). In this manner, the controller 130 now gets ready to perform various image sharing related functions.

First of all, the controller 130 sees if the digital camera 100 is going to get connected to the image sharing server 300 for the first time (in Step S502). As described above, since the digital camera 100 is supposed to be connected to the image sharing server 300 from the second time and on, the account information and access number are stored in the flash memory 142. That is why the controller 130 determines that this is not the first time the digital camera 100 is connected to the image sharing server 300.

Subsequently, the controller 130 sends the account information that is stored in the flash memory 142, not the device ID, to the image sharing server 300 (in Step S503). The device ID is a piece of property information to identify an individual product. That is why to leak a device ID to a third party is equivalent to leaking the content stored in the storage space that is linked with the product on the image sharing server 300.

For example, suppose what if the storage space secured on the image sharing server 300 were configured to be accessible by sending the device ID every time. In that case, if the user lost his or her digital camera 100 or got it stolen, then the content stored in the storage space on the image sharing server 300, including sensitive personal information (such as the person's images), might be accessed by somebody else. For that reason, when the digital camera 100 is going to get connected to the image sharing server 300 from the second time and on, the image sharing server 300 can verify the user with the account information instead of verifying him or her with the device ID.

With the account information stored in place of the device ID in this manner, even if the device ID itself leaked or if the product including the device ID were lost or stolen, the personal information would never be accessed. It should be noted that the storage space secured on the image sharing server 300 is linked with not just the device ID but also the account information as well. That is why if necessary, the user could cut the link of the device ID with the storage space secured by sending a request to the image sharing server 300 as will be described in detail later with reference to FIG. 10.

On getting the account information from the digital camera 100, the image sharing server 300 sees if that account information is found in the management table (in Step S504). If that account information is not found anywhere in the management table, the image sharing server 300 notifies the digital camera 100 of that and prompts the user to initialize the digital camera 100. In response, the user initializes the digital camera 100, resets the data stored in the flash memory 142 and then makes the initial settings as already described with reference to FIG. 6. In this manner, the image sharing server 300 secures a storage space that is linked with the device ID of the digital camera 100.

On the other hand, if the account information gotten from the digital camera 100 is found in the management table, the image sharing server 300 requests the controller 130 of the digital camera 100 to send the access number (in Step S505). In response, the controller 130 of the digital camera 100 retrieves the access number from the flash memory 142 and sends it to the image sharing server 300 in response (in Step S506). On getting the access number from the digital camera 100, the image sharing server 300 notifies the digital camera 100 that the digital camera 100 may have access to the storage space that is linked with the device ID on the image sharing server 300 (in Step S507).

On being authorized in Step S507 by the image sharing server 300, the controller 130 of the digital camera 100 displays, on the LCD monitor 123, image(s) stored in either the flash memory 142 or the memory card 140 (in Step S508). In this case, either a single image may be displayed or a plurality of images may be displayed at a time as a list of thumbnails. In the latter case, by operating the interface section 150 while looking at the list of thumbnails that are displayed on the LCD monitor 123, the user chooses image(s) that he or she wants to send to the image sharing server 300 (in Step S509). In this case, either only a single image or multiple images may be chosen. Alternatively, images may also be chosen on a folder basis, instead of an image file basis.

When the user chooses the image(s) he or she want to send, the controller 130 of the digital camera 100 sends the chosen images at a time to the image sharing server 300 (in Step S510). While sending the images, the controller 130 posts, on the LCD monitor 123, an alert that the images are now being sent. Thus, the user can see easily that the images are being sent.

On getting those images from the digital camera 100, the image sharing server 300 sequentially writes those images one after another on the storage space linked with the access number that has already been gotten (in Step S511). And on finishing the write operation, the image sharing server 300 notifies the digital camera 100 of that (in Step S512).

When notified by the image sharing server 300 that the write operation has ended, the controller 130 of the digital camera 100 changes menus on the LCD monitor 123 into the one with which he or she can choose the images to send (in Step S513). As a result, the user can send the images that are stored in the flash memory 142 or the memory card 140 to the image sharing server 300 without a break.

Figure 8:
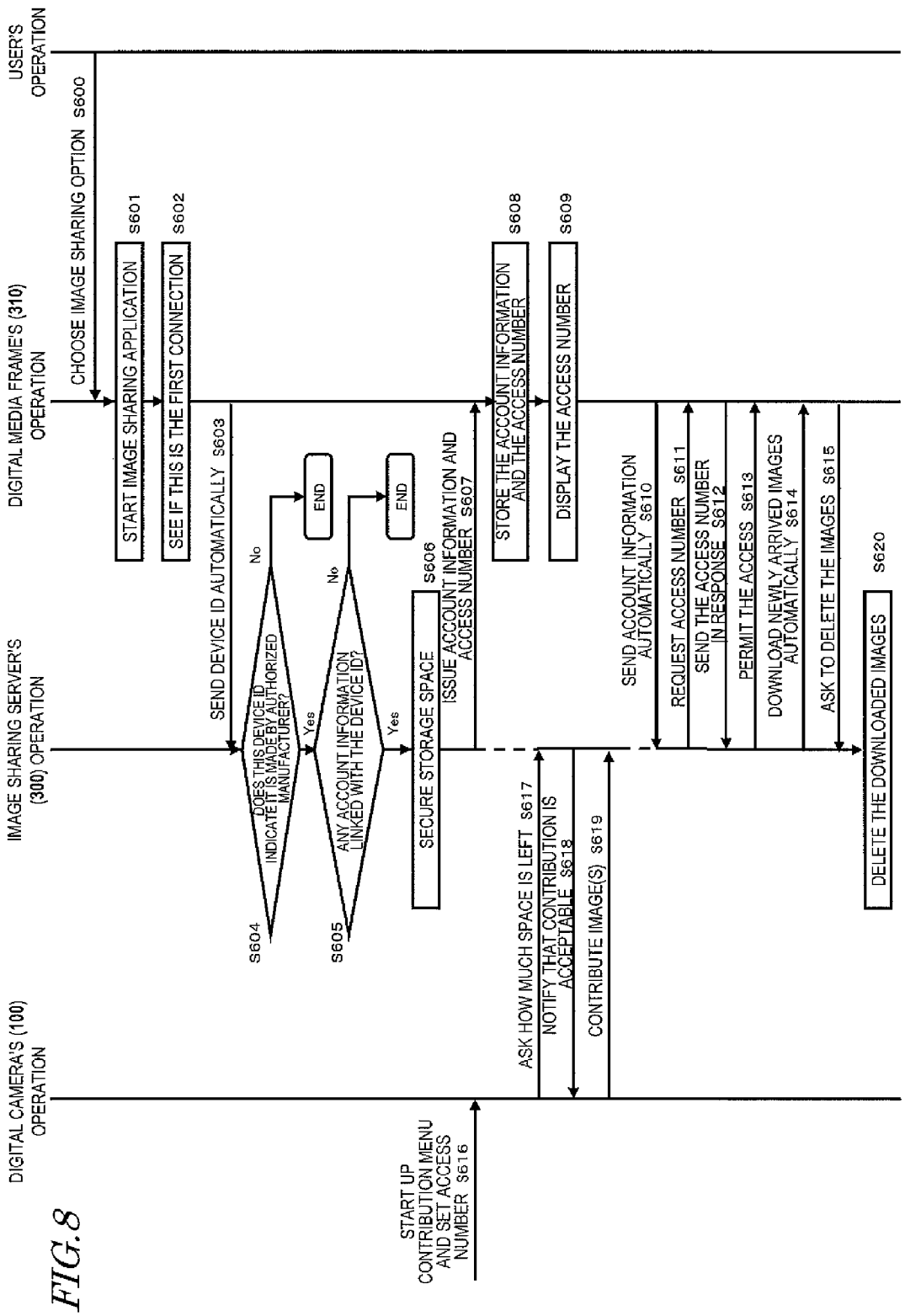
FIG. 8 is a flowchart showing how the system works when the digital media frame 310 is going to get connected to the image sharing server 300.

FIG. 8 is a flowchart showing how the system works when the digital media frame 310 is going to get connected to the image sharing server 300.

In FIG. 8, the processing step S600 of choosing an image sharing option, the processing step S601 of starting up an image sharing application, the processing step S602 of seeing if the digital media frame 310 is going to get connected for the first time, the processing step S603 of sending the device ID automatically, the processing step S604 of checking the device ID, the processing step S605 of checking the account information, the processing step S606 of securing a storage space, and the processing step S607 of issuing the account information and access number are substantially the same as the processing steps S401 through S407, respectively, which have already been described with reference to FIG. 6. And their description will be omitted herein. Naturally, the operations of the digital camera 100 in those processing steps S401 through S407 shown in FIG. 6 should be rewritten into those of the digital media frame 310.

On getting the account information and access number from the image sharing server 300, the digital media frame 310 stores the account information and access number gotten in the flash memory 317 (in Step S608). Then, the digital media frame 310 displays the access number on the LCD monitor 315 (in Step S609). The user of the digital media frame 310 writes down the access number being displayed on the LCD monitor 315 and tells it to a third party he or she wants to provide images for him or her. The access number may be given to the third party either by sending an email including the access number to the third party or telling the number to the third party orally so that the access number is entered into the third party's telecommunications device. This access number is given to the storage space on the image sharing server 300 which is linked with the device ID that is stored in the flash memory 317 of the digital media frame 310. That is why to the third party's eye, the access number is comparable to a mailbox of the user of the digital media frame 310.

In FIG. 8, the processing step S610 of sending the account information automatically, the processing step S611 of requesting the access number, the processing step S612 of sending the access number in response, and the processing step S613 of permitting the access are substantially the same as the processing steps S503, S505, S506, and S507, respectively, which have already been described with reference to FIG. 7 and their description will be omitted herein. Naturally, the operations of the digital camera 100 in those processing steps S503, S505, S506, and S507 shown in FIG. 7 should be rewritten into those of the digital media frame 310.

In the example shown in FIG. 8, the digital camera 100 is supposed to belong to the third party that has gotten the access number from the user of the digital media frame 310. The third party operates the digital camera 100 to start up a contribution menu (in Step S616). On starting up the contribution menu, the controller 130 of the digital camera 100 prompts the user to set the access number. In response, the third party operates the digital camera 100 to enter and set the access number that has been told to him or her by the user of the digital media frame 310. As a result, the digital camera 100 is now ready to contribute content data such as the image data that is stored in its own memory card, for example, to the storage space on the image sharing server 300 which is linked with the device ID of the digital media frame 310 (and which is the storage space dedicated to that user). Before contributing the content data from the digital camera 100, the controller 130 of the digital camera 100 asks the image sharing server 300 how much space is still left in its own dedicated storage space in the image sharing server 300 (in Step S617). In response, the image sharing server 300 checks out the remaining space in its own dedicated storage space, and if space that is large enough to accept a new contribution is still left, the image sharing server 300 notifies the digital camera 100 that the new contribution is acceptable (in Step S618). On receiving the acceptance from the image sharing server 300, the digital camera 100 sends the image data to contribute to the image sharing server 300 by reference to the access number that has been told to the digital camera 100 by the user of the digital media frame 310 (in Step S619). In response, the image sharing server 300 stores a new arrival flag indicating that a new contribution from the digital camera 100 has been accepted. The image data may be contributed from the digital camera 100 to the dedicated storage space at any arbitrary timing determined by the third party. The digital camera 100 is permitted to contribute image data to its own dedicated storage space but is prohibited from accessing the image data. This is because the dedicated storage space is a private space for the user of the digital media frame 310 and it would be inconvenient if the data stored in the dedicated storage space were accessible freely.

On being notified in Step S613 that the access is permitted, the controller 312 of the digital media frame 310 asks whether or not any new contribution has arrived at the image sharing server 300. By finding that the new arrival flag that has been stored previously is ON, the image sharing server 300 determines that there should be a new contribution and notifies the digital media frame 310 of that. In response to the notification of the arrival of a new contribution from the image sharing server 300, the digital media frame 310 requests the image sharing server 300 to send that new contribution. On receiving the request to send the new contribution from the digital media frame 310, the image sharing server 300 sends the new contribution (such as a newly arrived still picture or moving picture) to the digital media frame 310 (in Step S614). As a result, the user of the digital media frame 310 gets an impression that as if the newly arrived image that has just been contributed to the image sharing server 300 were being downloaded automatically.

The digital media frame 310 instructs the image sharing server 300 to delete the downloaded image once the newly arrived image has been downloaded (in Step S615). In accordance with the delete instruction by the digital media frame 310, the image sharing server 300 deletes the image that has already been downloaded to the digital media frame 310 from the storage space that is linked with the device ID of the digital media frame 310 (in Step S620).

The user of the digital media frame 310 should hope to see the newest image that has just been contributed from the digital camera 100 whenever that happens. Meanwhile, there is a problem that the storage space secured in the image sharing server 300 is only a limited space. Supposing the storage space secured in the image sharing server 300 is too little, even if the digital camera 100 that is going to make a new contribution checks out in Step S617 how much space is left, the digital camera 100 cannot send the image due to the unavailability of affordable space.

However, the digital media frame 310 of this embodiment instructs the image sharing server 300 to delete the newly arrived image once that image has been downloaded. That is why the storage space in the image sharing server 300 can be as much a space left as possible. Consequently, the user of the digital media frame 310 can enjoy the newly arrived images at any time.

Also, as long as it is turned ON, polling is carried out at regular intervals (e.g., every two hours or every twenty-four hours) on the digital media frame 310 as for the processing steps S610 through S615. As a result, newly arrived images that have just been contributed to the image sharing server 300 can be automatically downloaded to the digital media frame 310 at regular intervals.

Hereinafter, it will be described how the telecommunications system of this embodiment performs an account aggregation operation.

In the telecommunications system of this embodiment, a storage space linked with the device ID of a telecommunications device (such as the digital camera 100 or the digital media frame 310) is secured on the image sharing server 300. In other words, each telecommunications device is given a storage space linked with its own device ID by the image sharing server 300. That is why if a single user owns a plurality of telecommunications devices, then a plurality of storage spaces linked with the respective device IDs of those telecommunications devices are secured in the image sharing server 300. The image sharing server 300 simply manages the storage spaces on a device ID basis and does not know at this point in time exactly who the users of products with those device IDs are. If multiple storage spaces in the image sharing server 300 are secured in this manner for a single user, he or she has to change the accounts to access every content stored in his or her own storage spaces, which is a very time consuming business for him or her.

To avoid such a situation, the telecommunications system of this embodiment links with each other the respective accounts of those storage spaces that have been generated for those telecommunications devices (which will be referred to herein as an "account aggregation operation"). By performing the account aggregation operation, the user can access his or her own storage spaces one after another.

Figure 9:
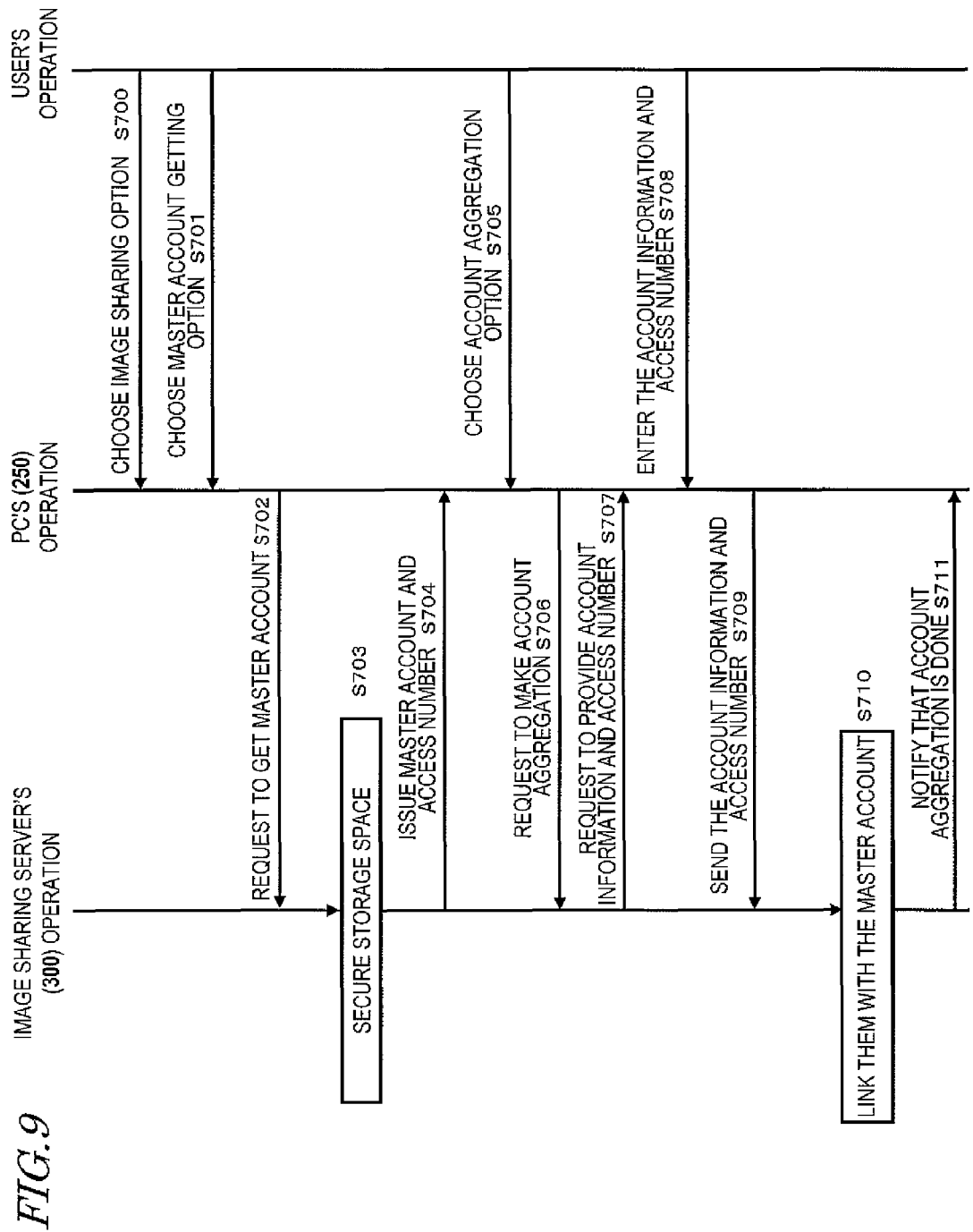
FIG. 9 is a flowchart showing the procedure of the operation of aggregating the accounts that have been given to multiple telecommunications devices.

FIG. 9 is a flowchart showing the procedure of the operation of aggregating the accounts that have been given to multiple telecommunications devices. By operating the PC 250, the user can aggregate the accounts of the storage spaces that have been given to multiple telecommunications devices such as the digital camera 100 and the digital media frame 310.

First of all, by operating the user interface of the PC 250 such as the mouse 262, the user chooses an image sharing option on the menu (in Step S700). When the image sharing option is chosen by the user, the controller 251 of the PC 250 starts up an image sharing application, thereby displaying a service menu for accessing the user's own storage space in the image sharing server on the LCD monitor 256. In response, by operating the mouse 262 or any other interface, the user chooses a master account getting option on the service menu displayed on the LCD monitor 256 (in Step S701). In this description, the "master account" means an account given by the PC 250 to the user him- or herself when using the image sharing service.

On accepting the choice of the master account getting option by the user, the controller 251 of the PC 250 requests the image sharing server 300 to get the master account (in Step S702). When choosing the master account getting option, the user enters his or her personal information to subscribe to the image sharing service.

On receiving the request to get a master account from the PC 250, the image sharing server 300 secures a storage space linked with the personal information that has been registered by the user who is requesting the master account (in Step S703). Then, the image sharing server 300 manages the access number indicating that storage space secured, the personal information registered, and the master account by linking them with each other in the management table. Then, the image sharing server 300 issues a master account and an access number to the PC 250 (in Step S704). As a result, a master account has been issued to the user. The following Table 2 shows exemplary contents of a management table including the master account. Specific values are not shown in this table.

TABLE 2

| Master account | storage space's access number | Personal information registered | device ID: N | Account information: N | access number: N |
|---|---|---|---|---|---|

In Table 2, "device ID: N", "account information: N" and "access number: N" are provided for each of the telecommunications devices registered such as the digital media frame.

Given the master account, the user can now choose the account aggregation option. For that purpose, by operating the mouse 262 or any other interface, the user chooses the account aggregation option on the image sharing service menu being displayed on the LCD monitor 256 (in Step S705). When the account aggregation option is chosen by the user, the PC 250 requests the image sharing server 300 to make the account aggregation (in Step S706). This account aggregation request is also a request to integrate multiple accounts together and will be sometimes referred to herein as an "account integration request", too.

When receiving the account aggregation request from the PC 250, the image sharing server 300 requests the PC 250 to provide the account information and access numbers in order to find on what telecommunications devices' account information and access numbers need to be subjected to the account aggregation (in Step S707). In response, the PC 250 displays, on the LCD monitor 256, a dialog box on which the user can enter the account information and access numbers of the telecommunications devices to be subjected to the account aggregation. Then, by using the keyboard 263 or any other interface, the user enters the account information and access numbers of the telecommunications devices he or she wants to subject to the account aggregation (in Step S708).

For example, if the user wants to subject the account information and access numbers that have been given to his or her own digital camera 100 and digital media frame 310 to the account aggregation, then he or she enters the account information and access numbers that have been given to the digital camera 100 and the digital media frame 310 into the PC 250. When the user has entered the account information and access numbers of the telecommunications devices to be subjected to the account aggregation, he or she will press the ENTER key or button.

When the account information and access numbers of the telecommunications devices to be subjected to the account aggregation are determined, the PC 250 notifies the image sharing server 300 of those pieces of account information and access numbers (in Step S709). On being notified of the account information and access numbers, the image sharing server 300 sees if the account information and access numbers provided are included in the management table managed in its own memory. Unless the account information and access numbers provided are included, the image sharing server 300 notifies the PC 250 that there is no such account information or access number there. On the other hand, if the account information and access numbers provided are included, then the image sharing server 300 links the storage spaces which are defined by the account information and access numbers provided with the storage space defined by the master account (in Step S710). Specifically, the image sharing server 300 adds the device IDs, account information and access numbers of the digital camera 100 and digital media frame 310 to be subjected to the account aggregation to the management table (such as Table 2) that already includes the master account information. By reference to those device IDs, account information, and access numbers that have been added to the master account information, the PC 250 can recognize what devices are linked with the master account.

For example, if the user has entered the account information and access numbers of the digital camera 100 and the digital media frame 310, then the respective storage spaces given to the digital camera 100 and the digital media frame 310 are linked with the storage space given to the mater account. As a result, when logging in the master account in the image sharing service using the PC 250, the user can now access or edit the respective storage spaces of the digital camera 100 and the digital media frame 310.

When the account aggregation is done, the image sharing server 300 notifies the PC 250 of that (in Step S711) and the controller 251 of the PC 250 posts an alert on the LCD monitor 256. In this manner, the user of the PC 250 can know that the account aggregation has been done.

As can be seen, in the telecommunications system of this embodiment, even if a storage space has already been secured in the image sharing server 300 for each of the telecommunications devices, those storage spaces can be linked with the master account by making the account aggregation as described above, and therefore, the user can access or edit the storage spaces one after another. Also, when the account aggregation is done, the user's personal information registered, the master account, the access number of the storage space linked with the master account, the device IDs of the telecommunications devices (such as the digital camera 100 and the digital media frame 310), and the account information and access numbers of the storage spaces that are linked with the device IDs are stored in the management table in association with each other. As a result, the image sharing server 300 can know who the user is and what his or her own telecommunications devices are. It should be noted that even after the account aggregation has been done, the device IDs are still maintained, and therefore, the storage spaces linked with the device IDs are not given unlimitedly. The reason is that it can be seen by reference to the access information and access numbers that are stored in the management table that the storage spaces have already been given to those device IDs.

In the processing step S703 shown in FIG. 9 described above, a storage space is supposed to be newly secured in response to the master account getting request (Step S702). However, it is not always necessary to secure a new storage space in such a situation. Alternatively, instead of securing a new storage space, a storage space linked with the account that has been gotten for a device such as a camera or TV may be defined as a space to be accessible with the master account.

In the telecommunications system of this embodiment, each of the multiple telecommunications devices is given a storage space linked with its device ID on the image sharing server 300. And when making normal communications, each telecommunications device accesses its storage space using the account information and access number that are linked with that storage space.

Meanwhile, if the user resold, lost or got stolen his or her telecommunications device, for which a storage space has been secured in the image sharing server 300, then a third party, different from the user who is the original owner, could or should get that telecommunications device. In such a situation, if the device ID of that telecommunications device were still linked with the storage space in the image sharing server 300, the original owner's private content could be accessed by that third party. Thus, to overcome such a problem, the telecommunications system of this embodiment invalidates the device ID and the account information and access number in such a situation in accordance with the user's instruction that has been entered through the PC 250. As a result, the storage space secured in the image sharing server 300 is no longer accessible with the account information or the access number, and even if the telecommunications device were resold or lost or got stolen unintentionally and were in the hands of an unexpected third party, there would be much less concern that his or her private content would be accessed by them.

Figure 10:
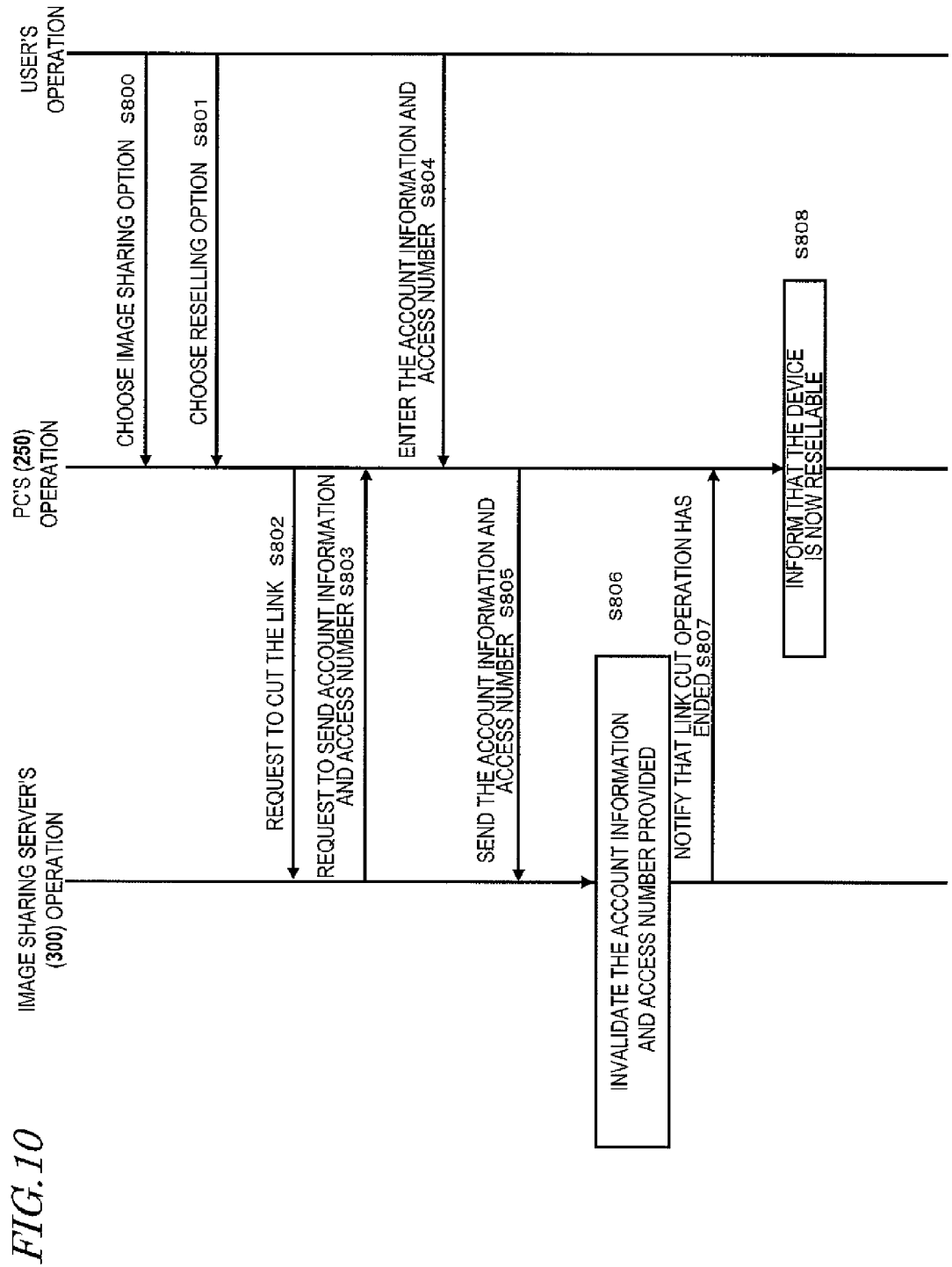
FIG. 10 is a flowchart showing the processing steps to perform in order to cut the link between an account, a storage space and a telecommunications device.

FIG. 10 is a flowchart showing the processing steps to perform in order to cut the link between an account, a storage space and a telecommunications device. This processing may be carried out in response to a link cut request that has been submitted by the user through a PC.

First of all, by operating a user interface such as the mouse 262 of the PC 250, the user chooses an image sharing option (in Step S800). When the image sharing option is chosen by the user, the controller 251 of the PC 250 starts up an image sharing application, thereby displaying a service menu for accessing the user's own storage space in the image sharing server on the LCD monitor 256. In response, by operating the mouse 262 or any other interface, the user chooses a reselling option on the service menu displayed on the LCD monitor 256 (in Step S801).

On accepting the user's choice of the reselling option, the PC 250 requests the image sharing server 300 to cut the link between the telecommunications device specified (or its device ID) and the storage space (i.e., the storage space that has been linked with the device ID) (in Step S802).

On receiving the link cut request from the PC 250, the image sharing server 300 determines whether or not the user of the telecommunications device, which is the object of the link cut request, has gotten a master account yet. If the user has not gotten a master account yet, the image sharing server 300 notifies the PC 250 that he or she should get a master account. The image sharing server 300 recommends this so that the storage space that has been secured for the telecommunications device (or its device ID) to cut the link with will be linked with the master account after the link of the telecommunications device (or its device ID) with the storage space has been cut. If the user still wants to use the storage space even after the link of his or her device with the storage space has been cut, he or she may get a master account at this point in time.

On the other hand, if the user of the telecommunications device to cut its link with the storage space has already gotten a master account, then the image sharing server 300 requests the PC 250 to send the account information and access number of the telecommunications device to cut the link with (in Step S803).

In response, the controller 251 of the PC 250 displays, on the LCD monitor 256, a dialog box on which the user can enter the account information and access number of the telecommunications device to cut its link with. Then, by using the keyboard 263 or any other interface, the user enters the account information and access number of the telecommunications devices to cut its link with while looking at the screen of the LCD monitor 256 of the PC 250 (in Step S804). For example, if the user wants to cut the link of his or her digital camera 100, he or she enters the account information and access number of the storage space that has been belonged to the digital camera 100 in the image sharing server 300.

Then, the controller 251 of the PC 250 notifies the image sharing server 300 of the account information and access number that have been entered by the user (in Step S805). In response, by reference to the account information and access number provided, the image sharing server 300 invalidates the storage space that has belonged to the telecommunications device in question (such as the digital camera 100), its device ID, and the account information and access number provided (in Step S806).

Next, the image sharing server 300 turns the storage space, which has had its link with the device ID, the account information and the access number cut, into a storage space which is accessible with a master account. In this case, the content data (such as image data) stored in the storage space that has been linked with that telecommunications device is left there as it is. As a result, by accessing the master account through the PC 250, the user can access and edit the content data in that storage space that used to be, but is no longer, linked with the telecommunications device. Furthermore, since the device ID, account information and access number of the telecommunications device that has had its link cut have already been invalidated, the storage space that used to be linked with that telecommunications device in the image sharing server 300 would no longer be accessible even if the device were now in the hands of a third party.

When the link cut operation is finished, the image sharing server 300 notifies the PC 250 that the telecommunications device is now resellable (in Step S807). On being notified by the image sharing server 300 that the link cut operation has ended, the controller 251 of the PC 250 notifies the LCD monitor 256 that the telecommunications device may now be resold (in Step S808). As a result, the user can resell securely the telecommunications device (such as the digital camera 100) that has had its link cut. Or by cutting the link of a telecommunications device that has been lost or stolen, the user can ensure his or her private data's security.

Although an embodiment of a telecommunications system has been described herein as just an example of the present disclosure, various modifications, replacements, additions or omissions can be readily made on that embodiment as needed and the present disclosure is intended to cover all of those variations. Also, a new embodiment can also be created by combining respective elements that have been described for the above-mentioned embodiments 1 to N.

Hereinafter, modified examples of the embodiment described above will be described.

In the embodiment described above, the PC 250 is supposed to be used. However, this is just an example of the present invention. A smart phone or a tablet terminal device may also be used instead of, or in addition to, the PC 250. Optionally, the telecommunications device itself such as the digital camera 100 or the digital media frame 310 may have the master function of the PC 250 described above.

Also, in the embodiment described above, the digital camera 100 is supposed to be used. But this is only an example of the present invention, too. Alternatively, as long as it can communicate with the image sharing server and can provide image data (including still pictures and moving pictures), audio data, character data or any other content data, any other kind of telecommunications device may be used as well.

Furthermore, even though the digital media frame 310 is supposed to be used in the embodiment described above, this is only an example of the present invention, too. Alternatively, as long as it can communicate with the image sharing server and can output some kind of content (e.g., display an image based on image data (including still pictures and moving pictures), output audio based on audio data, or display characters based on character data), any other kind of telecommunications device may be used as well.

In the embodiment described above, the HDD 304 is supposed to be arranged in the housing of the image sharing server 300 (see FIG. 4) and a plurality of storage spaces linked with multiple device IDs are supposed to be secured in the HDD 304. However, there is no need to provide only one HDD 304 in the housing of the image sharing server 300. Alternatively, the data in the HDD 304 may be stored separately in multiple storage devices.

Various embodiments of the present disclosure have been described by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the present disclosure. Therefore, please do not make a superficial decision that those inessential additional elements are indispensable ones simply because they are illustrated or mentioned on the drawings or the description.

Also, the embodiments disclosed herein are just an example of the present disclosure, and therefore, can be subjected to various modifications, replacements, additions or omissions as long as those variations fall within the scope of the present disclosure as defined by the appended claims and can be called equivalents.

3. Advantageous Effects, Etc.

In the embodiment of the present disclosure described above, the telecommunications system 50 includes at least one telecommunications device and the server 300 which can communicate with the at least one telecommunications device over the network 104. The at least one telecommunications device may be the digital camera 100, the PC 250 or the digital media frame 310.

In one embodiment, the digital camera 100 includes a storage section 142 in which stored is property information that identifies the device itself uniquely and a communications section 171 which sends the property information to the server 300 when communicating with the server 300 for the first time. The server 300 includes a storage device 304, a server communications section 301 which receives the property information, and a controller 302 which secures a storage space associated with that property information in the storage device on receiving the property information. The controller 302 generates account information which allows a user to have access to the storage space secured and which is associated with the property information gotten. And the server communications section 301 sends the account information to the digital camera 100 that has transmitted the property information.

The property information (i.e., device ID) which should be protected highly securely with respect to the system itself is used only when the digital camera 100 communicates with the server 300 for the first time. On receiving that property information, the controller 302 of the server 300 secures a storage space which is associated with the property information in the storage device, and generates account information associated with the property information gotten. And the server communications section 301 sends the account information to the digital camera 100 that has provided its property information. From the second time and on, the digital camera 100 uses the account information and access number that have been issued by the server 300 instead of the device ID. As a result, a telecommunications system which is usable more easily for any user can be provided while enhancing the security of the telecommunications system itself.

Also, in another embodiment of the present disclosure, the server communications section 301 further sends access information which indicates the location of the storage space in order to enable the user to have access to the storage space secured.

In still another embodiment, after having received the account information, the communications section 171 of the digital camera 100 accesses the storage space that has been secured in the storage device 304 of the server 300 by reference to the account information and the access information. In this manner, the digital camera 100 can locate uniquely the storage space to access by using the access information.

In yet another embodiment, the communications section 171 of the digital camera 100 sends content data, and the storage device 304 of the server 300 writes the content data in the storage space. In this manner, the digital camera 100 can upload content data to the server 300.

In yet another embodiment, the communications section 311 of the digital media frame 310 receives content data that has been read from the storage space. In this manner, the content data can be downloaded from the server 300 to the digital media frame 310.

In yet another embodiment, the controller 302 of the server 300 associates the storage space with not only the property information but also the account information. When the server communications section 301 receives the account information, along with a predetermined request (e.g., a link cut request), from the PC 250, the controller 302 of the server 300 cuts off the association of the storage space with the property information but keeps the storage space associated with the account information. As a result, the user can now access and edit the content data stored in the storage space that used to be, but is now no longer, associated with the telecommunications device.

The server communications section 301 receives, along with the association cut request, the account information from the PC 250. By invalidating the account information provided, the user can resell safely the telecommunications device (such as the digital camera 100) that has had its association cut off. Or by cutting off the association of a telecommunications device that has been lost or has gotten stolen, the user can protect his or her private data's security.

It should be noted that the present invention does not have to be implemented as a digital camera or a digital media frame. That is to say, the present invention is applicable to a movie camera, a smart phone or any other telecommunications device with a communications section or a telecommunications system including such a telecommunications device and a server.

In this application, the entire contents of Japanese Patent Applications No. 2011-181253 filed with the Japanese Patent office on Aug. 23, 2011 and No. 2012-177844 filed with the Japanese Patent office on Aug. 10, 2012, are hereby incorporated by reference.

What is claimed is:

1. A telecommunications system comprising:
at least one telecommunications device in communication with at least one server via a network, including:
a storage medium that stores property information identifying the device; and
a communications portal that automatically communicates the property information to the at least one server when communicating with the server for the first time;
the at least one server including:
a storage device;
a server communications portal that receives the property information communicated by the communications portal of the telecommunications device; and
a controller that secures a storage space associated with the property information in the storage device in response to receiving the property information, the controller automatically generating account information associated with the property information for allowing a user access to the storage space secured, and
wherein the server communications portal communicates the account information for allowing access to the storage space to the telecommunications device that has transmitted the property information.

2. The telecommunications system of claim 1, wherein the server communications portal further sends access information which indicates the location of the storage space in order to enable the user to have access to the storage space secured.

3. The telecommunications system of claim 2, wherein after having received the account information, the communications portal of the at least one telecommunications device accesses the storage space that has been secured in the storage device of the server by reference to the account information and the access information.

4. The telecommunications system of claim 3, wherein the communications portal of the at least one telecommunications device sends content data, and
wherein the storage device of the server writes the content data in the storage space.

5. The telecommunications system of claim 3, wherein the communications portal of the at least one telecommunications device receives content data that has been retrieved from the storage space.

6. The telecommunications system of claim 3, wherein the controller of the server associates the storage space with the property information and the account information, and
wherein when the server communications portal receives the account information, along with a predetermined request, from the at least one telecommunications device, the controller of the server terminates the association of the storage space with the property information while maintaining the storage space associated with the account information.

7. The telecommunications system of claim 6, wherein the server communications portal receives the account information, along with a request that requires to terminate the association, from the at least one telecommunications device.

8. The telecommunications system of claim 1, wherein the at least one telecommunications device includes a first telecommunications device and a second telecommunications device, and
wherein the server communications portal sends first and second pieces of account information to the first and second telecommunications devices, respectively, and
wherein the communications portal of the first telecommunications device sends a request to obtain a master account, a request to integrate multiple accounts, and the first and second pieces of account information, and
wherein on receiving the request to obtain, the controller of the server issues a master account associated with the storage space in the storage device and allows the user access to that storage space, and
wherein on receiving the request to integrate, the controller of the server associates the storage space that is associated with the master account and the respective storage spaces that are associated with respective pieces of property information of the first and second telecommunications devices.

9. A telecommunications device for use in a telecommunications system including a server that is able to communicate with the telecommunications device via a network, the telecommunications device comprising:
a storage medium that stores property information that uniquely identifies the device; and
a communications portal that automatically communicates the property information to the server when communicating with the server for the first time, and
wherein the communications portal receives account information generated automatically by the server, the account information being associated with the property information for allowing access by the telecommunications device to the storage space that has been secured by the server when the property information was first received.

10. A server for use in a telecommunications system including at least one telecommunications device, with which the server is able to communicate via a network,
the at least one telecommunications device including: a storage medium that stores property information that uniquely identifies the device; and a communications portal that automatically sends the property information to the server when communicating with the server for the first time,
the server comprising:
a storage device;
a server communications portal that receives the property information communicated by the communications portal of the telecommunications device; and
a controller that secures a storage space associated with the property information in the storage device upon receiving the property information,
wherein the controller automatically generates account information associated with the property information for allowing the telecommunication device to access the storage space secured, and
wherein the server communications portal communicates the account information for allowing access to the storage space to the telecommunications device that has transmitted the property information received by the server communications portal.

11. A telecommunications server comprising:
a server communications portal receiving an identification information for specific telecommunications devices;
a server controller that allocates storage space, on a server storage device, associated with the identification information in response to receiving the identification information;
the server controller that automatically generates account information for allowing, access to the allocated storage space associated with the identification information received; and
the server communications portal that communicates the account information associated with the received identification information for specific telecommunications devices for allowing access to the storage space.

* * * * *